UNITED STATES PATENT OFFICE.

DAVID CHIDLOW, OF RIDGEFIELD CONNECTICUT, ASSIGNOR TO JAMES F. STRACHAN AND WILLIAM S. STRACHAN, OF MONTREAL, QUEBEC, CANADA.

PROCESS OF MAKING BREAD.

1,255,292.  Specification of Letters Patent. Patented Feb. 5, 1918.

No Drawing.  Application filed January 4, 1917. Serial No. 140,543.

*To all whom it may concern:*

Be it known that I, DAVID CHIDLOW, a subject of the King of Great Britain, residing at Ridgefield, in the county of Fairfield and State of Connecticut, have invented an Improvement in Processes of Making Bread, of which the following description, in connection with the accompanying drawings, is a specification, like characters on the drawings representing like parts.

The invention to be hereinafter described relates to an improved process or method of manufacturing bread of good edible qualities from whole grain.

It has been heretofore proposed to make bread from whole grain, such as wheat, by steeping the whole grain in warm water a sufficient length of time to cause germination of the grain and then crushing the moist grain in a dough mill so that the whole grain is converted into dough, which is set aside for the necessary length of time at a suitable temperature to permit the chemical action of the yeast inherent therein and to cause the dough to expand or rise. When the dough has thus reached the desired condition, it has been formed into loaves and baked.

It is well known by those skilled in the art, however, that the whole grain, as for instance the grain of wheat, is covered by a thin paper like skin consisting almost entirely of cellulose. This skin constitutes the protecting cover for the oily layer beneath, the cuboid cells, the endosperm, and other interior portions of the wheat grain. On the other hand, this paper like skin consists of approximately 90% pure cellulose and possesses no food value, but constitutes an intestinal irritant when eaten, and is one of the main medical objections to bread formed of whole grain. Where the process or method of bread-making has included a germination or partial germination of the whole grain, the retention of the skin or paper like covering has been considered a prerequisite to the germinating action of the grain. I have discovered, however, that by proper treatment the objectionable and indigestible cellular skin or cover may be removed from the grain without injury to the remaining portion of the grain structure and without affecting or changing the germinating property of the grain, and that by further treatment, as will hereinafter appear, bread of most excellent edible quality may be produced from germinated whole grain without the admixture therewith of the indigestible and irritating skin.

In carrying out my improved process for converting whole unground grain, such as wheat or rye, for instance, into bread free from the objectionable skin or cover of the grain, the whole grain is first subjected to a wetting action of sufficient duration to swell the grain without, however, causing germination thereof. This preliminary wetting may continue for several minutes, say from four to five minutes or longer, according to the character of the grain being treated, and has the effect of moistening the outer skin portion of the grain and expanding it, without, however, expanding the inside of the grain. At the end of a few minutes, the outer skin of the grain will be found moistened and expanded to a sufficient extent to permit its ready removal without injury to the grain structure beneath the skin. The removal of the outer skin may be effected readily by subjecting the grain to a gentle rubbing or peeling action without injury to the underlying layers of the grain, and when the outer skin is thus removed, I have found that the germinating property of the grain is not impaired. This rubbing action to thus remove the outer skin may be carried into effect in various ways, as for instance, by passing the prepared whole grains while wet between relatively moving surfaces.

The outer skin having been removed, the now naked grain is subjected to a germinating action for several hours, the number of which may vary under different surrounding conditions, such as the character of the grain, temperature and the like, so that the germ is rendered active and a transformation of the grain constituents takes place which had not been effected by the preliminary wetting step in the process. The germinating action of the grain may continue for approximately twenty hours and at a proper temperature, such for instance as 80° F. or 90° F.

When the naked grain has sufficiently germinated, as described, it is well to wash the grain in order to carry away bacteria that may be developed during germination, though this is not an essential step in the present process.

The naked grain having been germinated and either washed or not as circumstances may dictate, and while it is still wet or moist, is crushed to form a doughy mass to which is added salt and yeast either with or without sugar. Sometimes a second crushing of the naked germinated whole grain may be found desirable to break up any large particles that may have escaped the first crushing action. The dough thus produced is then placed in a container or dough trough for a few hours, about one to three hours according to the character of grain employed, at the end of which time it is ready to be made into loaves and baked in the usual way.

From the above description of the present invention it will be seen that the improved process contemplates a substantially continuous treatment of the grain, such as wheat, first to soften and swell the outer skin of the grain and then to remove the outer skin without injury to the germinating property of the grain, then germinating the naked or skinned grain for a suitable time, and thereafter and while the germinated naked grain is still wet or moist, crushing it to form a dough to which may be added a fermenting agent, such as yeast, and then baking the dough.

What is claimed is:—

1. The herein described process for manufacturing bread from whole grain, which consists in wetting the grain for a sufficient length of time to soften and swell the exterior of the grain without causing germination thereof, then removing the outer skin of the grain without injuring the germinating property of the grain, then germinating the naked grain, and crushing the germinated naked grain to form a dough, and then baking the same.

2. The herein described process of manufacturing bread from whole grain which consists in removing the outer skin of the grain without injuring the germinating property of the grain, then germinating the naked grain, and thereafter, while the naked germinated grain is still wet or moist crushing it to form a dough and then baking the same.

In testimony whereof, I have signed my name to this specification.

DAVID CHIDLOW.